United States Patent
Negishi

(10) Patent No.: US 12,528,421 B2
(45) Date of Patent: Jan. 20, 2026

(54) STRUCTURAL OBJECT MOUNTING STRUCTURE

(71) Applicant: TOYOTA JIDOSHA KABUSHIKI KAISHA, Aichi-ken (JP)

(72) Inventor: Toshimitsu Negishi, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 262 days.

(21) Appl. No.: 18/314,141

(22) Filed: May 9, 2023

(65) Prior Publication Data

US 2024/0025349 A1 Jan. 25, 2024

(30) Foreign Application Priority Data

Jul. 20, 2022 (JP) ................................. 2022-115728

(51) Int. Cl.
| | |
|---|---|
| *B60R 11/00* | (2006.01) |
| *B60R 7/06* | (2006.01) |
| *B60R 11/02* | (2006.01) |
| *B60R 21/205* | (2011.01) |
| *B60R 21/2155* | (2011.01) |
| *B60R 21/215* | (2011.01) |

(52) U.S. Cl.
CPC ................ *B60R 11/00* (2013.01); *B60R 7/06* (2013.01); *B60R 11/0229* (2013.01); *B60R 11/0235* (2013.01); *B60R 21/205* (2013.01); *B60R 21/2155* (2013.01); *B60R 2011/0005* (2013.01); *B60R 2011/008* (2013.01); *B60R 2011/0084* (2013.01); *B60R 2011/0085* (2013.01); *B60R 2011/0092* (2013.01); *B60R 2021/21518* (2013.01); *B60R 2021/21537* (2013.01)

(58) Field of Classification Search
CPC ..... B60R 2011/0005; B60R 2011/0001; B60R 2011/0003; B60R 2011/0042; B60R 2011/008; B60R 2011/0085; B60R 2011/0084; B60R 2011/0092; B60R 11/00; B60R 11/0235; B60R 11/0229; B60R 7/06; B60R 2021/161; B60R 2021/162; B60R 2021/21518; B60R 2021/21537; B60R 21/16; B60R 21/205; B60R 21/2334; B60R 21/215; B60R 21/2155
USPC ................ 280/728.2, 728.3, 732; 248/205.1
See application file for complete search history.

(56) References Cited

U.S. PATENT DOCUMENTS

| | | | | | |
|---|---|---|---|---|---|
| 5,342,085 | A | * | 8/1994 | Hirashima | ............ B60R 21/215 |
| | | | | | 280/732 |
| 5,360,231 | A | * | 11/1994 | Adams | .................. B60R 21/205 |
| | | | | | 280/732 |

(Continued)

FOREIGN PATENT DOCUMENTS

| | | | |
|---|---|---|---|
| CN | 215284628 U | * | 12/2021 |
| CN | 216128146 U | * | 3/2022 |

(Continued)

*Primary Examiner* — Keith J Frisby
(74) *Attorney, Agent, or Firm* — HAUPTMAN HAM, LLP

(57) ABSTRACT

A structural object mounting structure of the disclosure is a structural object mounting structure for mounting a structural object on an instrument panel on a front passenger seat side of a vehicle. The structural object mounting structure includes a moving mechanism that moves the structural object in such a manner as not to prevent an airbag of a front passenger seat airbag device that has been inflated and deployed from being deployed.

11 Claims, 5 Drawing Sheets

(56) References Cited

U.S. PATENT DOCUMENTS

| | | | |
|---|---|---|---|
| 7,540,531 B2* | 6/2009 | Sakakibara | B60R 21/206 |
| | | | 280/732 |
| 11,370,381 B1* | 6/2022 | Mihm | B60R 21/205 |
| 11,590,914 B1* | 2/2023 | Llamazares Domper | ............ |
| | | | B60N 2/0276 |
| 2007/0046003 A1* | 3/2007 | Mori | B60R 21/213 |
| | | | 280/730.2 |
| 2014/0091561 A1* | 4/2014 | Fukawatase | B60R 21/205 |
| | | | 280/728.3 |
| 2019/0077357 A1* | 3/2019 | Rupp | B60R 21/233 |
| 2020/0172039 A1* | 6/2020 | Ghannam | B60R 21/2035 |
| 2020/0384861 A1* | 12/2020 | Kadam | B60K 35/50 |
| 2021/0053525 A1* | 2/2021 | Deutschmann | B60R 21/216 |
| 2021/0101554 A1* | 4/2021 | Rajagopalan | B60R 21/215 |
| 2021/0101557 A1* | 4/2021 | Malapati | B60R 21/205 |
| 2022/0024402 A1* | 1/2022 | Lee | B60R 11/0223 |
| 2024/0083250 A1* | 3/2024 | Jakobs | B60R 21/013 |

FOREIGN PATENT DOCUMENTS

| | | | | |
|---|---|---|---|---|
| DE | 102004040409 A1 * | 3/2006 | | B60R 21/205 |
| DE | 102020117111 A1 * | 12/2021 | | B60R 21/205 |
| DE | 102020122988 A1 * | 3/2022 | | B60R 11/0235 |
| FR | 2947226 A1 * | 12/2010 | | B60R 21/215 |
| FR | 3047701 A1 * | 8/2017 | | B60R 11/02 |
| JP | H0456553 U | 5/1992 | | |
| JP | H05-080920 U | 11/1993 | | |
| JP | H06127325 A | 5/1994 | | |
| JP | 2000025506 A * | 1/2000 | | |
| JP | 2000085437 A * | 3/2000 | | |
| JP | 2003306114 A * | 10/2003 | | |
| JP | 2006192943 A | 7/2006 | | |
| JP | 2008049716 A | 3/2008 | | |
| JP | 2019127102 A * | 8/2019 | | |

* cited by examiner

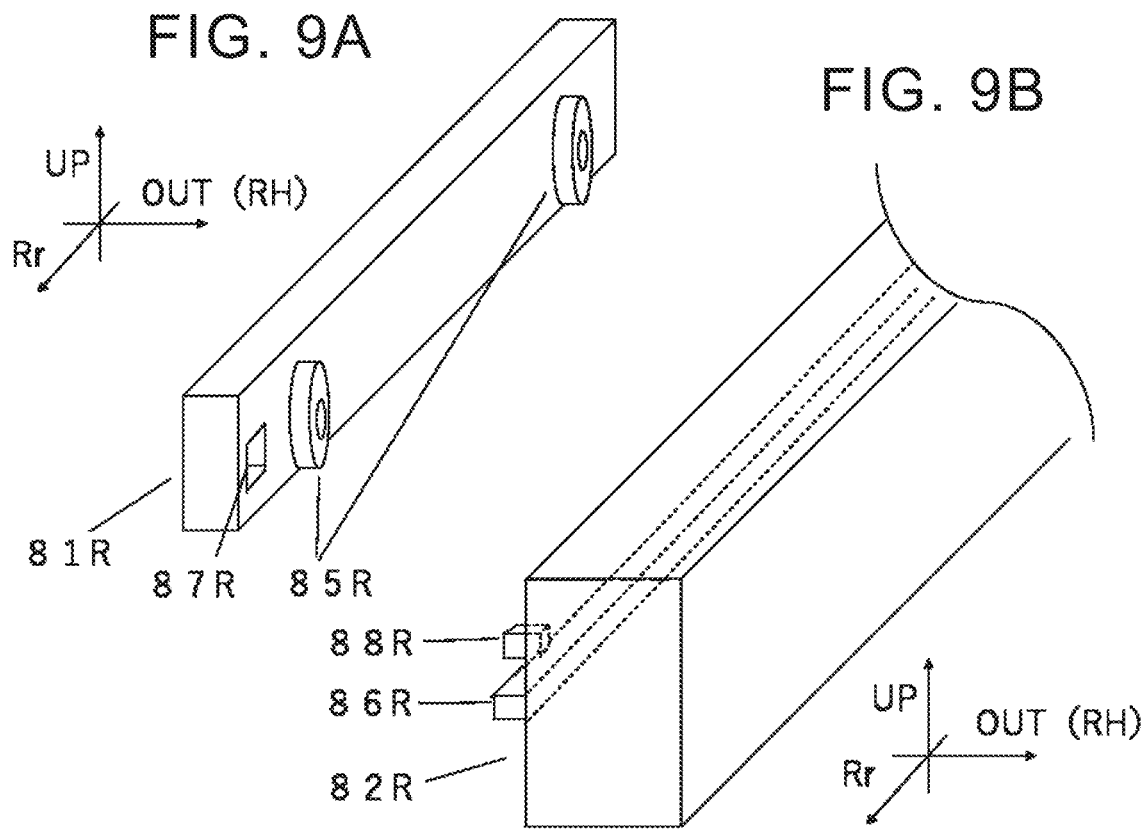
FIG. 9A
FIG. 9B
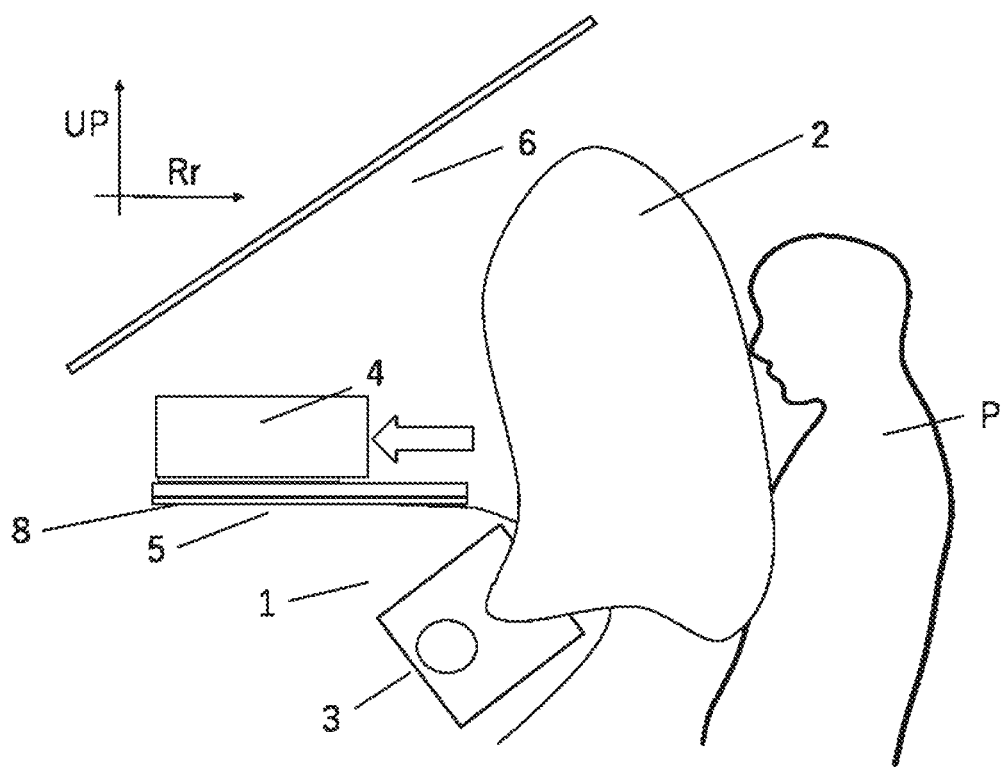
FIG. 10

STRUCTURAL OBJECT MOUNTING STRUCTURE

CROSS-REFERENCE TO RELATED APPLICATION

This application claims priority to Japanese Patent Application No. 2022-115728 filed on Jul. 20, 2022 incorporated herein by reference in its entirety.

BACKGROUND

1. Technical Field

The disclosure relates to a structural object mounting structure fitted to a lower portion of a structural object mounted on an instrument panel on a front passenger seat side of a vehicle, and more specifically, aims at reducing the input to a passenger by ensuring a space in which an airbag is deployed, through favorable movement of the structural object at the time of deployment of the airbag.

2. Description of Related Art

Conventionally, as an airbag device mounted in an automobile, there has been known a mid-mount type front passenger seat airbag device with an airbag module made up of an airbag and an inflator. The airbag module is configured to be disposed inside an instrument panel in front of a front passenger seat. The airbag is inflated toward a passenger diagonally backward and upward. This front passenger seat airbag device is provided with a deployment regulator that regulates the deployment of a lower half portion of the airbag at the time of deployment of the airbag (e.g., see Japanese Unexamined Patent Application Publication No. 6-127325 (JP 6-127325 A)).

According to this configuration, the mid-mount type airbag module is provided with the deployment regulator that regulates the deployment of the lower half portion of the airbag. Therefore, as a matter of course, the volume of the airbag can be made smaller than in the case of a high-mount type airbag device with an airbag that is inflated upward with respect to a vehicle and that is deployed along a windshield. Furthermore, due to regulation by the deployment regulator, the airbag is not directly inflated toward an out-of-position passenger, so an impact can be prevented from being made on the out-of-position passenger as in conventional cases.

SUMMARY

In recent years, the number of automobiles with an instrument panel on which a structural object such as a shelf or a monitor is mounted has been on the increase. In the configuration of JP 6-127325 A, the airbag is deployed before a lid 17*a* is sufficiently opened, when it is assumed that there is a structural object on the instrument panel. In this case, the airbag is deployed toward the passenger, and the input from the airbag to the passenger may increase.

A structural object mounting structure of the disclosure is configured to mount a structural object on an instrument panel on a front passenger seat side of a vehicle. The structural object mounting structure includes a moving mechanism that moves the structural object in such a manner as not to prevent an airbag of a front passenger seat airbag device that has been inflated and deployed from being deployed.

According to the structural object mounting structure configured to mount the structural object on the instrument panel in the disclosure, the input to the passenger can be reduced by ensuring a space in which the airbag is deployed, through favorable movement of the structural object at the time of deployment of the airbag.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9A is another schematic configuration view showing the structural object mounting structure according to the second embodiment of the disclosure;

FIG. 9B is still another schematic configuration view showing the structural object mounting structure according to the second embodiment of the disclosure; and FIG. 10 is a schematic view showing an airbag device of a vehicle having a structural object equipped with the structural object mounting structure according to the second embodiment of the disclosure, at the time of deployment of the airbag device.

DETAILED DESCRIPTION OF EMBODIMENTS

Figure 1:
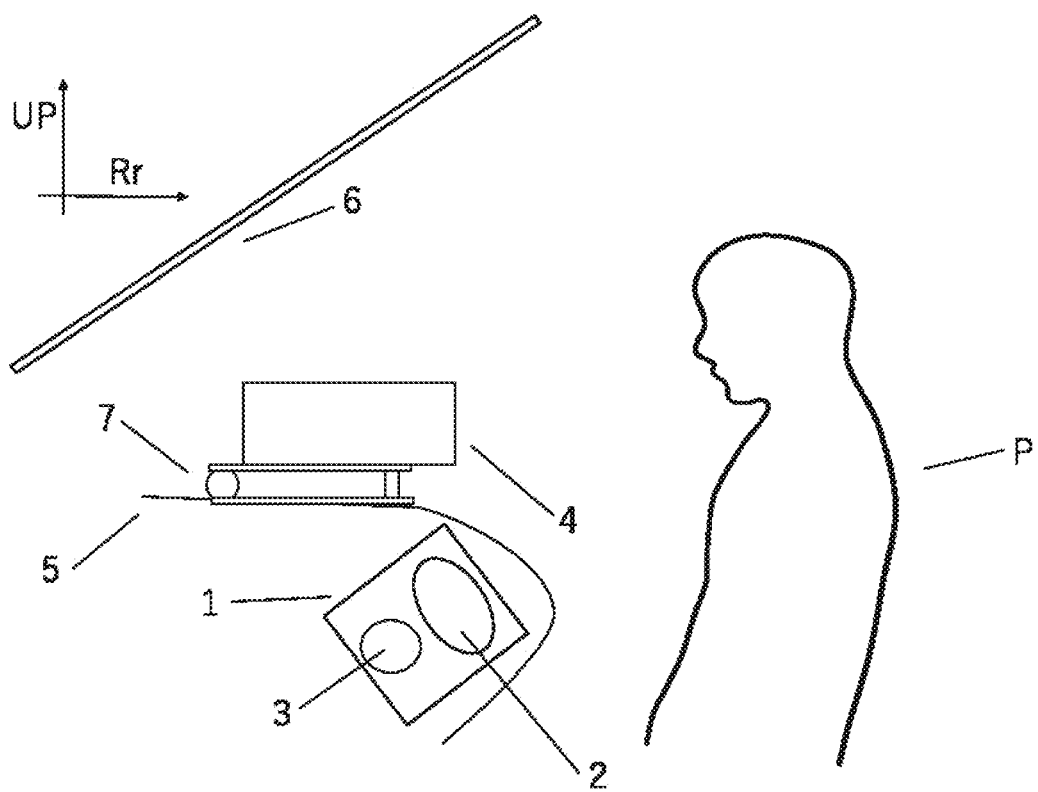
FIG. 1 is a schematic configuration view showing a vehicle interior of a vehicle having a structural object equipped with a structural object mounting structure according to the first embodiment of the disclosure.

The respective embodiments of a structural object mounting structure of the disclosure will be described hereinafter with reference to FIGS. 1 to 10. Incidentally, arrows Rr, UP, and OUT (RH) depicted in the drawings indicate a rear side in a vehicle longitudinal direction, an upper side in a vehicle vertical direction, and a right side in a vehicle width direction, respectively.

First Embodiment

First of all, the first embodiment will be described with reference to FIGS. 1 to 4.

In FIG. 1, an airbag module 1 is equipped with an airbag 2 stored inside the airbag module 1, and an inflator 3 that injects gas into the airbag 2 and inflates and deploys the airbag 2 when an acceleration equal to or larger than a predetermined value is applied thereto. The airbag module 1 is fitted inside that region of an instrument panel 5 of a vehicle which is located in front of a front passenger seat. Besides, a structural object 4 is mounted on the instrument panel 5 via a rotary mechanism portion 7. It should be noted herein that the rotary mechanism portion 7 in the present embodiment is equivalent to the moving mechanism of the disclosure. As the structural object 4, it is possible to mention, for example, a shelf capable of accommodating things, or a front passenger seat display. The structural object 4 is attached with a view to enhancing user-friendliness. Incidentally, the airbag 2 is usually accommodated and arranged inside the instrument panel 5 in a folded state. Besides, a windshield is denoted by 6.

An airbag door (not shown) is formed on that region of the instrument panel which corresponds to the airbag module 1. The airbag door is opened by a tear portion (not shown) that breaks open when the airbag 2 is inflated and deployed. Accordingly, when a collision of the vehicle is detected, the inflator 3 is actuated to inflate and deploy the folded airbag 2 toward the airbag door. The airbag 2 presses and breaks open the airbag door, and is inflated toward the passenger diagonally backward and upward.

Figure 2:
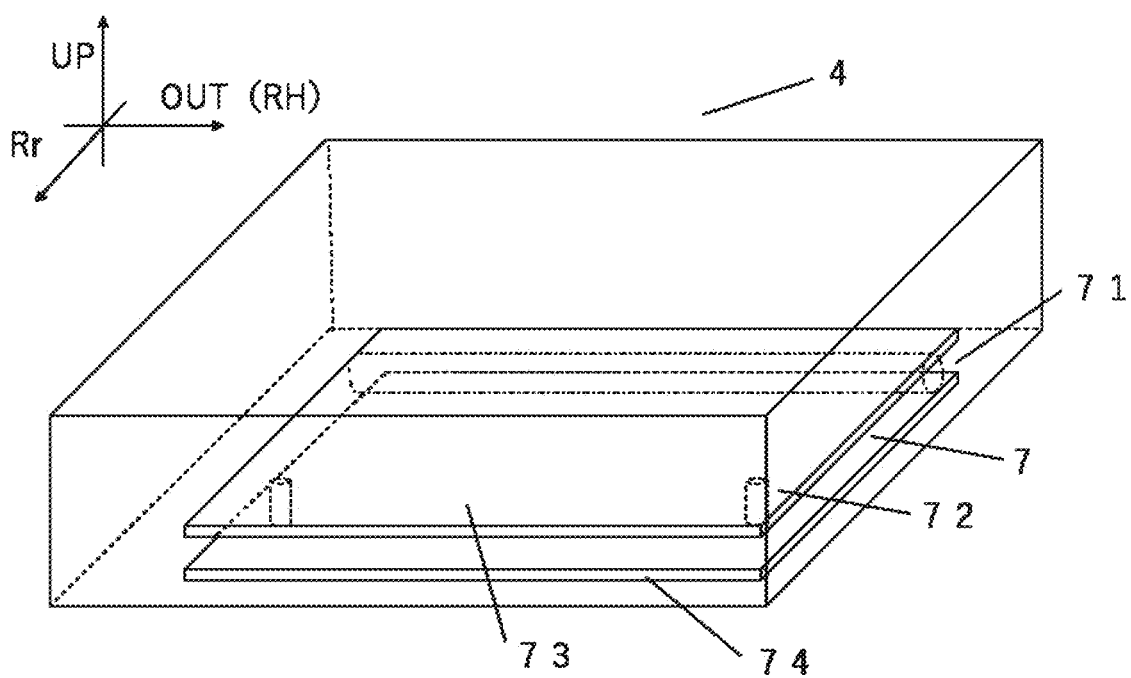
FIG. 2 is a schematic configuration view showing the structural object mounting structure according to the first embodiment of the disclosure.
Figure 3:
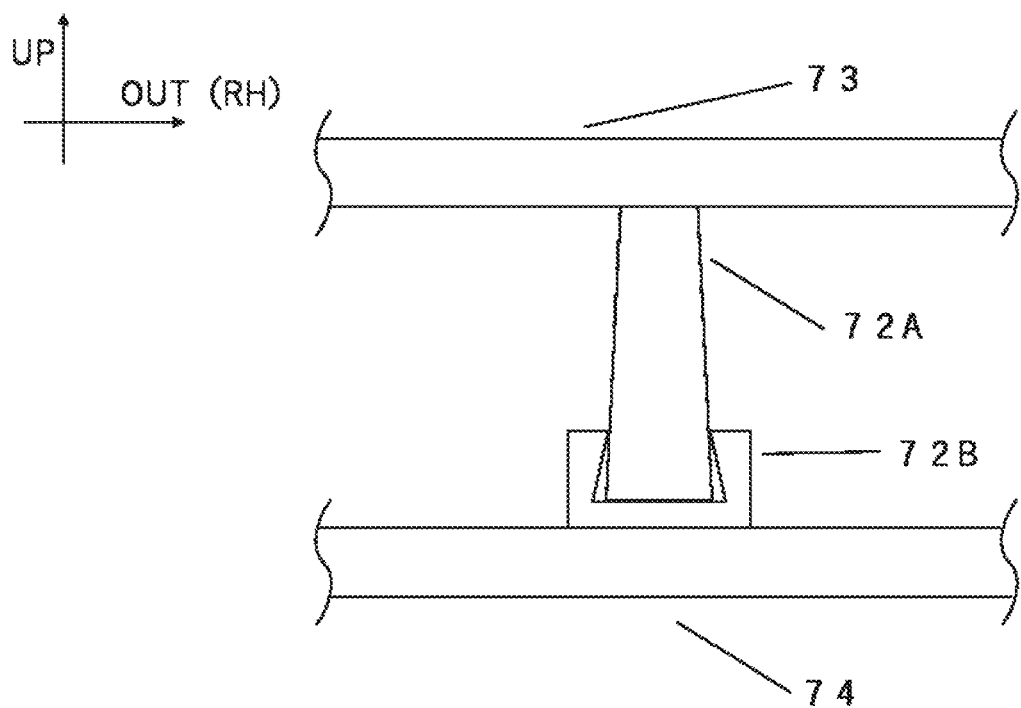
FIG. 3 is another schematic configuration view showing the structural object mounting structure according to the first embodiment of the disclosure.
Figure 4:
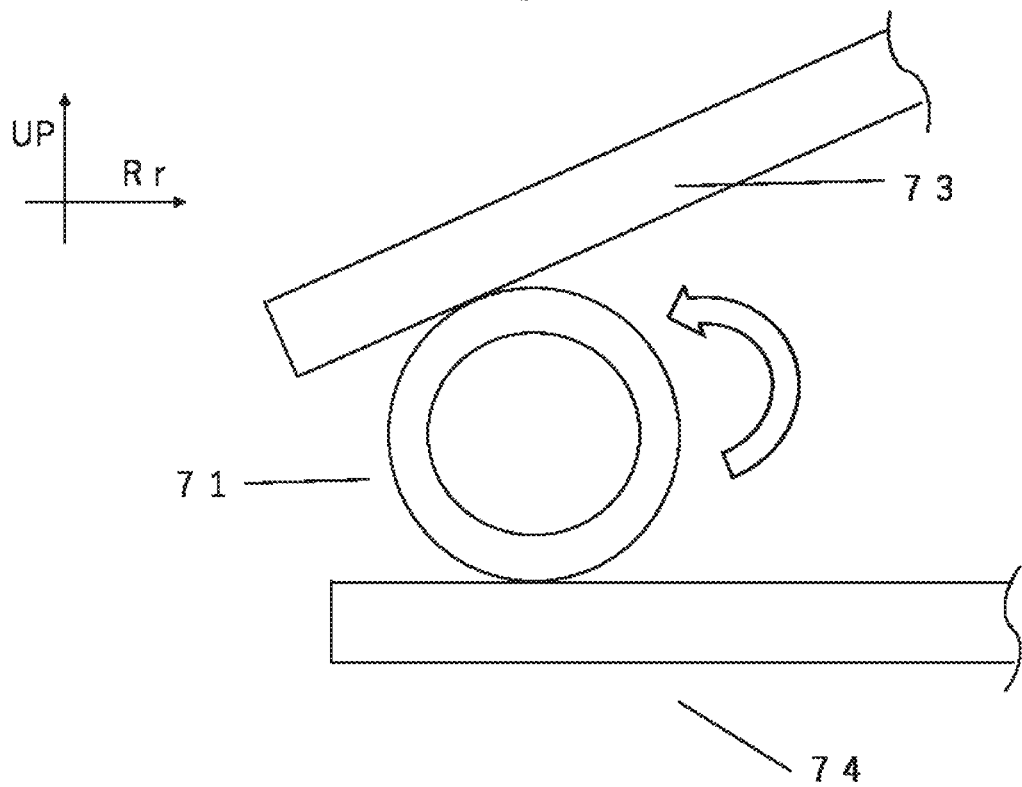
FIG. 4 is still another schematic configuration view showing the structural object mounting structure according to the first embodiment of the disclosure.

Referring to FIGS. 2 to 4, the rotary mechanism portion 7 will be described. As shown in FIG. 2, the rotary mechanism portion 7 is constituted of a hinge portion 71, a pin portion 72, an upper plate portion 73, and a lower plate portion 74. As shown in the drawing, the upper plate portion 73 is joined to a lower surface of the structural object 4. It should be noted herein that the upper plate portion 73 and the lower plate portion 74 in the present embodiment are equivalent to the upper joint portion and the lower joint portion of the disclosure respectively. Incidentally, the lower plate portion 74 is joined to the instrument panel 5. In the present embodiment, the joining of the upper plate portion 73 and the lower plate portion 74 is realized through adhesion by a double-faced adhesive tape, but is not limited thereto. It is possible to adopt various known joining structures such as the fastening by a bolt and a nut or the like.

As shown in FIG. 3, the pin portion 72 is constituted of an upper fitting portion 72A and a lower fitting portion 72B. It should be noted herein that the pin portion 72 in the present embodiment is equivalent to the fixation portion of the disclosure. Incidentally, fixation is realized through fitting in the present embodiment, but is not limited thereto. It is possible to adopt various known fixation methods such as the fixing by anchoring or the like. The upper fitting portion 72A is joined to the upper plate portion 73, and the lower fitting portion 72B is joined to the lower plate portion 74. The upper fitting portion 72A and the lower fitting portion 72B usually engage each other as shown in the drawing. The upper fitting portion 72A and the lower fitting portion 72B are set in such a manner as to be disengaged from each other when a load equal to or larger than a predetermined value is input to an upper side of the vehicle. Incidentally, in the present embodiment, the predetermined value is set as a load value at which the airbag 2 that is inflated and deployed comes into abutment on a rear end portion of at least one of the structural object 4 and the upper plate portion 73 with respect to the vehicle and presses at least one of the structural object 4 and the upper plate portion 73 substantially upward with respect to the vehicle. Besides, in other fixation methods as well, fixation is set in such a manner as to be canceled when a load equal to or larger than the predetermined value is input to the upper side of the vehicle. Incidentally, the load may be input not only through direct abutment of the airbag 2 on the end portion of the structural object 4 but also through abutment of part of the airbag door that has broken open through deployment of the airbag 2 on the rear end portion of at least one of the structural object 4 and the upper plate portion 73 with respect to the vehicle.

As shown in FIG. 4, the hinge portion 71 is configured to be turnable around an axis extending in the vehicle width direction. It should be noted herein that the hinge portion 71 and the upper plate portion 73 in the present embodiment are equivalent to the movable portion of the disclosure. When a load equal to or larger than the predetermined value is input to the upper side of the vehicle, the pin portion 72 is disengaged, and the upper plate portion 73 turns around the hinge portion 71 upward with respect to the vehicle.

Figure 5:
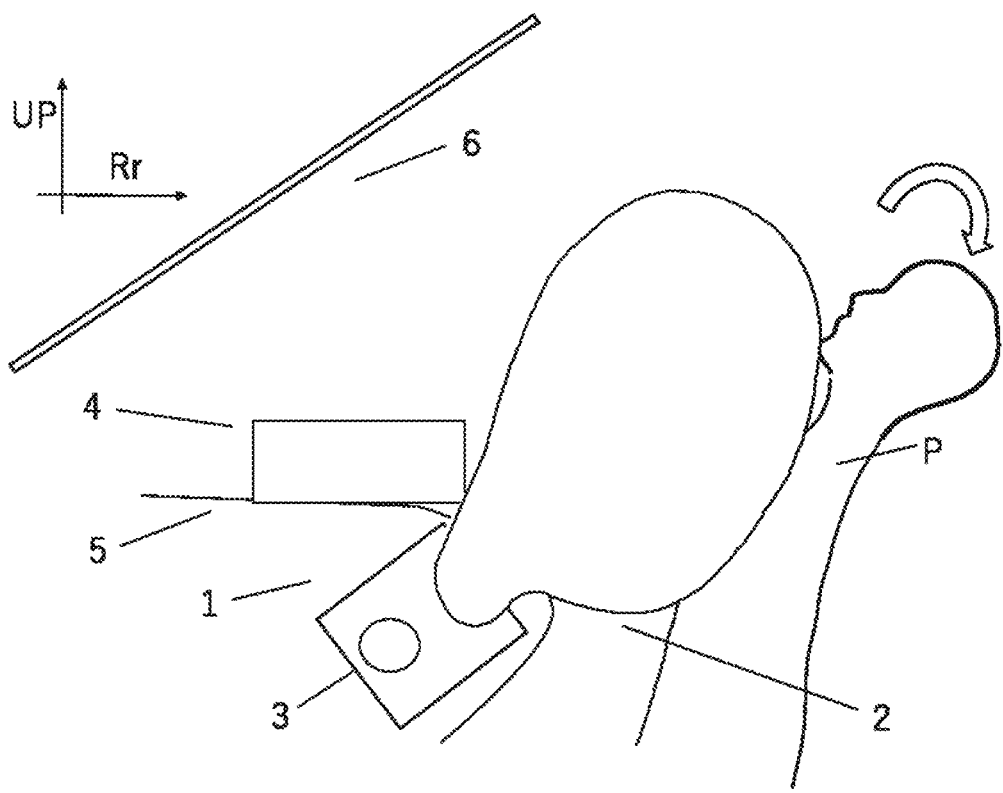
FIG. 5 is a schematic view showing an airbag device of a vehicle with an instrument panel on which a structural object devoid of the structural object mounting structure of the disclosure is installed, at the time of deployment of the airbag device.

Next, reference will be made to FIG. 5, which is a schematic view of deployment of the airbag 2 in the case where the structural object mounting structure for mounting the structural object 4 does not have the rotary mechanism portion 7. Incidentally, FIG. 5 does not show any of the embodiments of the disclosure. As shown in FIG. 5, when the structural object 4 installed on the instrument panel 5 is fixed, the airbag 2 is restrained from being deployed in the vehicle longitudinal direction. As a result, the input to the neck of a passenger P may increase.

Figure 6:
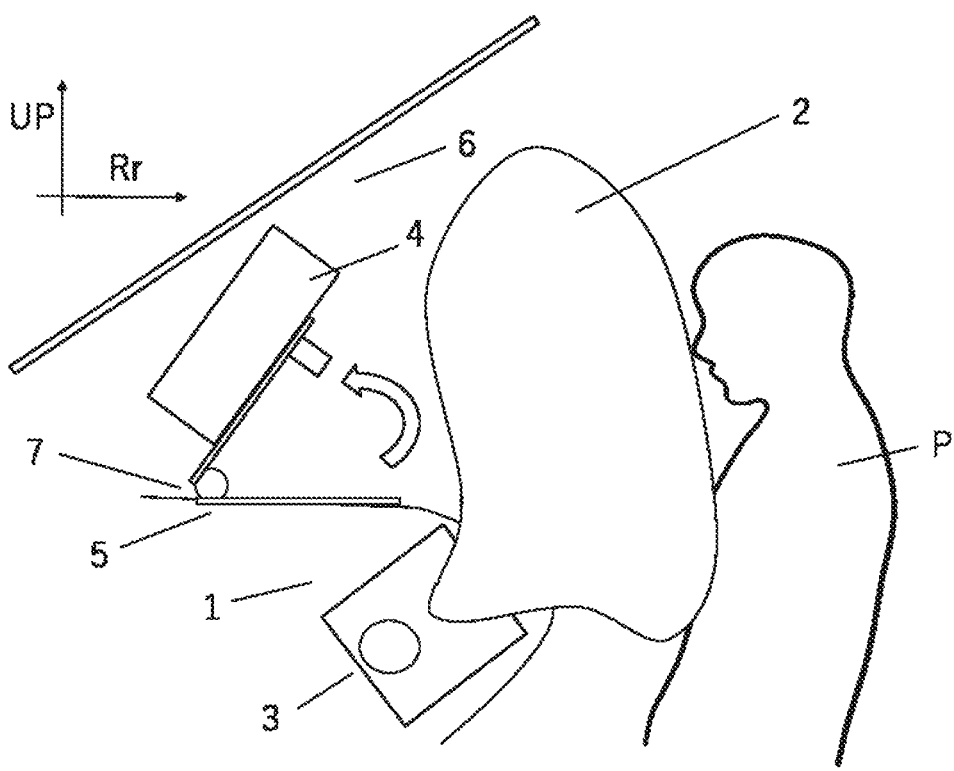
FIG. 6 is a schematic view of an airbag device of a vehicle having a structural object equipped with the structural object mounting structure according to the first embodiment of the disclosure, at the time of deployment of the airbag device.

Next, reference will be made to FIG. 6, which is a schematic view showing deployment of the airbag 2 in the case where the structural object mounting structure for mounting the structural object 4 has the rotary mechanism portion 7. The structural object 4 is mounted on the instrument panel 5 via the rotary mechanism portion 7, the rear end of the lower plate portion 74 in the vehicle longitudinal direction is located in front of a deployment region of the airbag 2, and the rear end of the upper plate portion 73 or the structural object 4 in the vehicle longitudinal direction is located in the deployment region of the airbag 2.

At this time, the lower plate portion 74 is located in such a manner as not to overlap with the deployment region of the airbag 2. Therefore, through deployment of the airbag 2, the deployment load of the airbag 2 is input to at least one of the upper plate portion 73 and the structural object 4 located in the deployment region of the airbag 2, the pin portion 72 is disengaged, the upper plate portion 73 rotates around the hinge portion 71 upward with respect to the vehicle, and as a result, the structural object 4 joined to the upper plate portion 73 moves upward with respect to the vehicle. Thus, the space in which the airbag 2 is deployed is ensured, and the airbag 2 can be deployed upward with respect to the vehicle. In consequence, the input to the passenger P is reduced.

Besides, in the present embodiment, the rotary mechanism portion 7 is configured to have the upper plate portion 73 and the lower plate portion 74, but is not limited thereto. The hinge portion 71 and the pin portion 72 may be directly joined to the structural object 4 and the instrument panel 5 respectively. Besides, the structural object 4 may not be pushed up by the deployment load of the airbag 2, and the upper plate portion 73 may be electrically rotated upward with respect to the vehicle by an electric motor or the like (not shown) provided on the hinge portion 71.

Second Embodiment

Next, the second embodiment will be described with reference to FIGS. 7 to 10. Incidentally, in the following description of the second embodiment, components identical to those of the foregoing embodiment will be denoted by the same reference symbols respectively, and the description thereof will be omitted. The following description will be limited to the differences between these embodiments.

Figure 7:
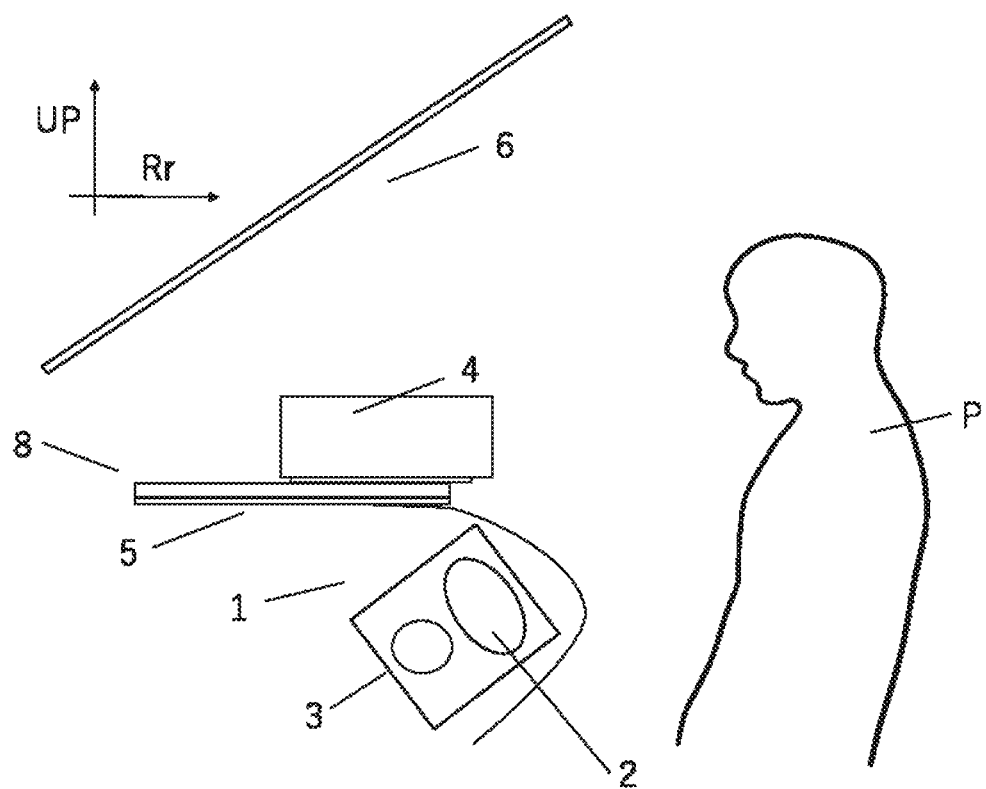
FIG. 7 is a schematic configuration view showing a vehicle interior of a vehicle having a structural object equipped with a structural object mounting structure according to the second embodiment of the disclosure.

In the present embodiment, the structural object 4 is mounted on the instrument panel 5 via a slide mechanism 8 such that the structural object 4 can move in the vehicle longitudinal direction as shown in FIG. 7. It should be noted herein that the slide mechanism 8 in the present embodiment is equivalent to the moving mechanism of the disclosure.

Figure 8:
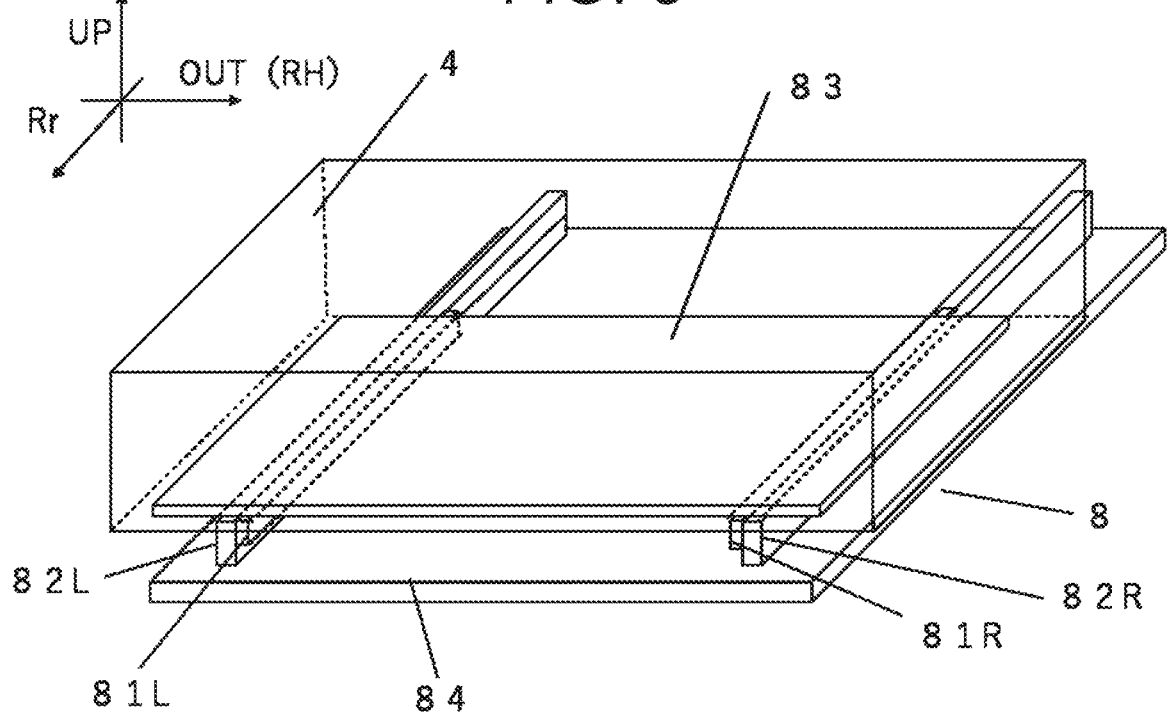
FIG. 8 is a schematic configuration view showing a structural object mounting structure according to the second embodiment of the disclosure.

The slide mechanism 8 will be described with reference to FIG. 8, FIG. 9A, and FIG. 9B. As shown in FIG. 8, the slide mechanism 8 is constituted of upper slide portions 81R and 81L, lower slide portions 82R and 82L, an upper plate portion 83, and a lower plate portion 84. The upper plate portion 83 is joined to the lower surface of the structural object 4 as shown in the drawing. Incidentally, the lower plate portion 84 is joined to the instrument panel 5. It should be noted herein that the upper plate portion 83 and the lower plate portion 84 in the present embodiment are equivalent to the upper joint portion and the lower joint portion of the disclosure respectively.

Next, the upper slide portions 81R and 81L and the lower slide portions 82R and 82L will be described with reference to FIG. 9A and FIG. 9B. Incidentally, reference symbols R and L are assigned to components of mirror symmetry having the same reference numeral, respectively. Therefore, only the components to which the reference symbol R is assigned will be described in the present embodiment.

FIG. 9A is a schematic configuration view of the upper slide portion 81R. The upper slide portion 81R is joined to a lower surface of the upper plate portion 83, and has roller portions 85R and a fitting hole 87R. The roller portions 85R are provided on that surface of the upper slide portion 81R which faces the lower slide portion 82R, and each of the roller portions 85R is configured to be rotatable around an axis extending along the vehicle width direction. The fitting hole 87R is provided in that surface of the upper slide portion 81R which faces the lower slide portion 82R, and is configured to engage a fitting protrusion 88R that will be described later. It should be noted herein that each of the fitting hole 87R and the fitting protrusion 88R in the present embodiment is equivalent to the fixation portion of the disclosure. Incidentally, fixation is realized through fitting in the present embodiment, but is not limited thereto. It is possible to adopt various known fixation methods such as fixation by anchoring.

FIG. 9B is a schematic configuration view of the lower slide portion 82R. The lower slide portion 82R is joined to an upper surface of the lower plate portion 84, and has a guide portion 86R and the fitting protrusion 88R. The guide portion 86R is provided on that surface of the lower slide portion 82R which faces the upper slide portion 81R, and is configured such that the roller portions 85R can move in the vehicle longitudinal direction. It should be noted herein that each of the upper slide portion 81R, the upper plate portion 83, the roller portions 85R, and the guide portion 86R in the present embodiment is equivalent to the movable portion of the disclosure. The fitting protrusion 88R is configured to engage the fitting hole 87R. The fitting hole 87R and the fitting protrusion 88R are set in such a manner as to be disengaged from each other when a load equal to or larger than a predetermined value is input to the upper side of the vehicle. Incidentally, in the present embodiment, the predetermined value is set as a load value at which the airbag 2 that is inflated and deployed comes into abutment on a rear end portion of at least one of the structural object 4 and the upper plate portion 83 with respect to the vehicle and presses at least one of the structural object 4 and the upper plate portion 83 substantially forward in the vehicle longitudinal direction. Besides, in other fixation methods as well, fixation is set in such a manner as to be canceled when a load equal to or larger than the predetermined value is input to the upper side of the vehicle. Incidentally, the load may be input not only through direct abutment of the airbag 2 on the end portion of the structural object 4 but also through abutment of part of the airbag door that has broken open through deployment of the airbag 2 on the rear end portion of at least one of the structural object 4 and the upper plate portion 83 with respect to the vehicle.

Next, reference will be made to FIG. 10, which is a schematic view of deployment of the airbag 2 in the case where the structural object mounting structure for mounting the structural object 4 has the slide mechanism 8. As shown in FIG. 10, the structural object 4 is installed on the instrument panel 5 via the slide mechanism 8, the rear end of the lower plate portion 84 in the vehicle longitudinal direction is located in front of the deployment region of the airbag 2, and the rear end of the upper plate portion 83 or the structural object 4 in the vehicle longitudinal direction is located in the deployment region of the airbag 2.

At this time, the lower plate portion 84 is located in such a manner as not to overlap with the deployment region of the airbag 2. Therefore, the deployment load of the airbag 2 is input to at least one of the upper plate portion 83 and the structural object 4 that are located in the deployment region of the airbag 2, the fitting hole 87R and the fitting protrusion 88R are disengaged from each other, and the upper plate portion 83 moves forward in the vehicle longitudinal direction. As a result, the structural object 4 also moves forward in the vehicle longitudinal direction. In consequence, the space in which the airbag 2 is deployed is ensured, the airbag 2 can be deployed upward with respect to the vehicle, and the input to the passenger P is reduced.

Besides, in the present embodiment, the slide mechanism 8 is configured to have the upper plate portion 83 and the lower plate portion 84, but is not limited thereto. The upper slide portions 81R and 81L and the lower slide portions 82R and 82L may be directly joined to the structural object 4 and the instrument panel 5 respectively. Besides, the structural object 4 may not be pressed forward in the vehicle longitudinal direction through the use of the deployment load of the airbag, and the upper plate portion 83 may be electrically moved forward in the vehicle longitudinal direction by an electric motor or the like (not shown) provided on each of the roller portions 85R.

The embodiments of the disclosure have been described above. However, it is obvious that the disclosure is not limited to the foregoing but can be carried out after being modified in various manners other than the foregoing within such a range as not to depart from the gist of the disclosure.

What is claimed is:

1. A structural object mounting structure configured to mount a structural object on an instrument panel on a front passenger seat side of a vehicle, the structural object mounting structure comprising:
    a moving mechanism configured to move the structural object in such a manner as not to prevent an airbag of a front passenger seat airbag device from being deployed, wherein
    the moving mechanism is configured to be positioned above the front passenger seat airbag device in a vehicle vertical direction, the moving mechanism includes:
an upper plate configured to be joined to the structural object,
a lower plate configured to be joined to the instrument panel, and
a hinge portion positioned between the upper plate and the lower plate and configured to rotate the upper plate around the hinge portion,
the moving mechanism is configured such that in a case where the lower plate is joined to the instrument panel,
a rear end of the upper plate in a front-rear direction of the vehicle is located in such a manner as to overlap with a deployment region of the airbag such that, in response to the airbag being deployed, a deployment load from the airbag is applied to the rear end of the upper plate, and
a rear end of the lower plate in the front-rear direction of the vehicle is located in such a manner as not to overlap the deployment region of the airbag.

2. The structural object mounting structure according to claim 1, wherein
the moving mechanism is configured to move the structural object through use of the deployment load of the airbag that has been inflated and deployed.

3. The structural object mounting structure according to claim 2, wherein
the moving mechanism has:
a movable portion, constituted by the hinge portion and the upper plate, configured to move the structural object; and
a fixation portion that fixes the movable portion, and
the fixation portion is configured to be unfixed through use of the deployment load of the airbag.

4. The structural object mounting structure according to claim 1, wherein
the moving mechanism has:
a movable portion, constituted by the hinge portion and the upper plate, configured to move the structural object; and
a fixation portion that fixes the movable portion, and
the fixation portion is configured to be unfixed through use of the deployment load of the airbag.

5. The structural object mounting structure according to claim 4, wherein
the movable portion is configured to be turnable around an axis extending in a vehicle width direction,
the fixation portion is provided behind the movable portion with respect to the vehicle, and is configured to fix the movable portion such that the movable portion does not turn, and
the movable portion is configured to turn the structural object upward with respect to the vehicle, in response to reception of the deployment load of the airbag by at least one of the structural object and the upper plate.

6. The structural object mounting structure according to claim 1, wherein the moving mechanism further includes a pin portion,
the pin portion includes
an upper fitting portion joined to the upper plate, and
a lower fitting portion joined to the lower plate,
wherein the upper fitting portion and the lower fitting portion are detachably engaged to each other.

7. The structural object mounting structure according to claim 6, wherein
the upper fitting portion and the lower fitting portion are detachably engaged to each other such that the upper fitting portion is configured to be disengaged from the lower fitting portion in response to the deployment load from the airbag that is equal to or larger than a predetermined value being applied to the rear end of the upper plate.

8. The structural object mounting structure according to claim 7, wherein
the pin portion is positioned on a rearward side of the moving mechanism in the front-rear direction of the vehicle with respect to the hinge portion.

9. The structural object mounting structure according to claim 8, wherein
the lower fitting portion of the pin portion includes a recess from which the upper fitting portion is detachably disengaged.

10. A structural object mounting structure configured to mount a structural object on an instrument panel on a front passenger seat side of a vehicle, the structural object mounting structure comprising:
a moving mechanism configured to move the structural object in such a manner as not to prevent an airbag of a front passenger seat airbag device from being deployed, wherein
the moving mechanism is configured to move the structural object through use of a deployment load of the airbag that has been inflated and deployed,
the moving mechanism has:
an upper joint portion configured to be joined to the structural object; and
a lower joint portion configured to be joined to the instrument panel,
a rear end of the upper joint portion in a front-rear direction of the vehicle is located in such a manner as to overlap with a deployment region of the airbag such that, in response to the airbag being deployed, the deployment load from the airbag is applied to the rear end of the upper joint portion,
the lower joint portion is located in such a manner as not to overlap with the deployment region of the airbag,
the moving mechanism has:
a movable portion configured to move the structural object; and
a fixation portion that fixes the movable portion, and
the fixation portion is configured to be unfixed through use of the deployment load of the airbag,
the movable portion is configured to be turnable around an axis extending in a vehicle width direction,
the fixation portion is provided behind the movable portion with respect to the vehicle, and is configured to fix the movable portion such that the movable portion does not turn, and
the movable portion is configured to turn the structural object upward with respect to the vehicle, in response to reception of the deployment load of the airbag by at least one of the structural object and the upper joint portion.

11. A vehicle, comprising:
an instrument panel on a front passenger seat side of the vehicle;
a structural object;
a structural object mounting structure that mounts the structural object on the instrument panel; and
a front passenger seat airbag device, wherein
the structural object mounting structure includes a moving mechanism configured to move the structural object in such a manner as not to prevent an airbag of the front passenger seat airbag device from being deployed, the moving mechanism is positioned above the front passenger seat airbag device in a vehicle vertical direction, the moving mechanism includes:
- an upper plate joined to the structural object,
- a lower plate joined to the instrument panel, and
- a hinge portion positioned between the upper plate and the lower plate and configured to rotate the upper plate around the hinge portion, a rear end of the upper plate in a front-rear direction of the vehicle is located to overlap with a deployment region of the airbag such that, in response to the airbag being deployed, a deployment load from the airbag is applied to the rear end of the upper plate, and a rear end of the lower plate in the front-rear direction of the vehicle is located to not overlap the deployment region of the airbag.

\* \* \* \* \*